United States Patent
Gentric et al.

(10) Patent No.: US 9,123,300 B2
(45) Date of Patent: Sep. 1, 2015

(54) ELECTROPHORETIC DISPLAY WITH SOFTWARE RECOGNIZING FIRST AND SECOND OPERATING FORMATS

(71) Applicant: Texas Instruments Incorporated, Dallas, TX (US)

(72) Inventors: Philippe Gentric, Valbonne (FR); Julien Sylvain Carre, Nice (FR); Sathish Thoppay Egambaram, Plano, TX (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 181 days.

(21) Appl. No.: 13/736,750

(22) Filed: Jan. 8, 2013

(65) Prior Publication Data

US 2014/0146036 A1    May 29, 2014

(30) Foreign Application Priority Data

Nov. 23, 2012   (EP) .................................. 12290409

(51) Int. Cl.
*G09G 3/34*   (2006.01)
(52) U.S. Cl.
CPC ..................................... *G09G 3/344* (2013.01)

(58) Field of Classification Search
CPC ................ G09G 3/3433–3/3446; G02F 1/167; G02F 1/172; G02F 2001/1672–2001/1678; G02B 26/026
USPC .......... 345/214, 215, 107, 694–696, 698, 699
See application file for complete search history.

(56) References Cited

U.S. PATENT DOCUMENTS

| | | | |
|---|---|---|---|
| 2006/0244755 A1* | 11/2006 | Emerson et al. | 345/581 |
| 2008/0129760 A1* | 6/2008 | Phan | 345/690 |
| 2009/0256799 A1* | 10/2009 | Ohkami et al. | 345/107 |
| 2010/0194789 A1* | 8/2010 | Lin et al. | 345/690 |

* cited by examiner

*Primary Examiner* — Nathan Danielsen
(74) *Attorney, Agent, or Firm* — Lawrence J. Bassuk; Frank D. Cimino

(57) ABSTRACT

Electrophoretic displays (EPDs) and methods for controlling EPDs are disclosed herein. An embodiment of an EPD includes a first operating format, wherein pixels on at least one area of the EPD are driven individually. The EPD has a second operating format, wherein a plurality of pixels constituting at least one area of the EPD are driven simultaneously. Both the first operating format and the second operating format are performable simultaneously on the EPD.

5 Claims, 2 Drawing Sheets

ELECTROPHORETIC DISPLAY WITH SOFTWARE RECOGNIZING FIRST AND SECOND OPERATING FORMATS

This application is based on and claims priority from European Patent Application No. 12290409.7 filed 23 Nov. 2012, which is incorporated herein by reference.

BACKGROUND

Some devices, such as electronic readers use electrophoretic displays (EPDs). The devices that use EPDs are sometimes referred to as electronic paper (e-paper) or electronic ink. EPDs may have very high resolution that may be comparable with liquid crystal displays. One of the unique properties of EPDs is that they reflect light rather than emit light; therefore, they simulate paper in that light reflects from the EPD. The EPDs are static in that individual pixels are turned dark or bright depending on the material being displaced to the display visible surface. For that reason, once a pixel is set, it will stay in that state indefinitely, even after power has been removed. Therefore, EPDs can display images for a long period using minimal or no power.

There are two formats for driving EPDs. A first format is wherein each pixel is controlled independently, which is sometimes referred to as the pixelar format. The pixelar format also allows for an EPD to change images very fast. However, the pixelar format requires a very high bandwidth and memory consumption to operate and may not be necessary for most applications.

The second format for driving EPDs is sometimes referred to as the regional format. In the regional format, groups of pixels are controlled or changed simultaneously. For example, the regional format may display a plurality of non-overlapping rectangles. A plurality of rectangles may form text that is displayed on the EPD. The regional format uses much less bandwidth and memory than the pixelar format because a lot of data stored to hold the display context is the same for all pixels. This format may provide high resolution, but it does not enable quick changes to images displayed on an EPD.

SUMMARY

Electrophoretic displays (EPDs) and methods for controlling EPDs are disclosed herein. An embodiment of an EPD includes a first operating format, wherein pixels on at least one area of the EPD are driven individually. The EPD has a second operating format, wherein a plurality of pixels constituting at least one area of the EPD is driven simultaneously. Both the first operating format and the second operating format are performable simultaneously on the EPD.

DETAILED DESCRIPTION

Figure 1:
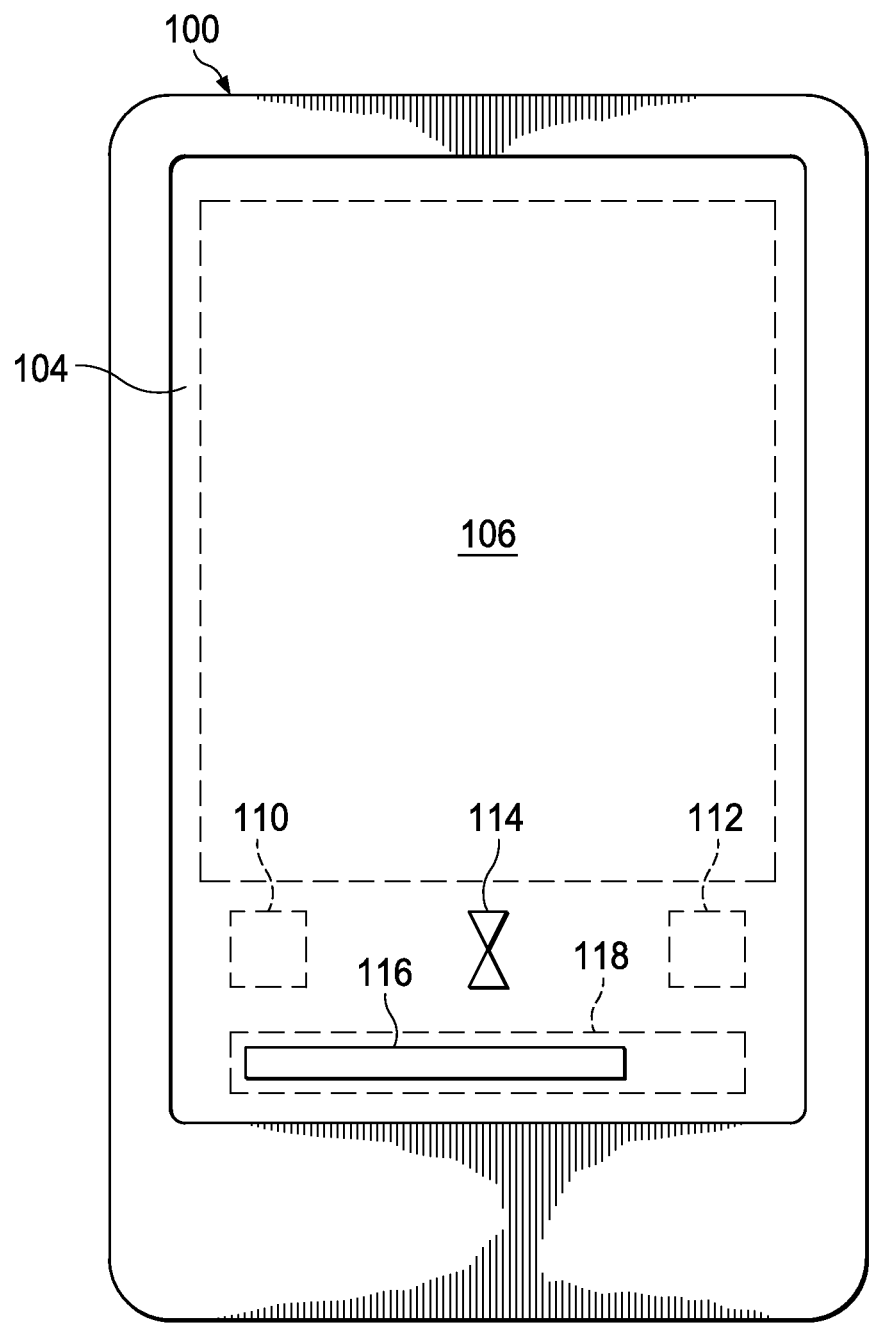
FIG. 1 is an embodiment of an electronic device having a display that uses both pixelar and regional formats.

Devices and methods for operating or driving electrophoretic displays (EPDs) are disclosed herein. Devices that use EPDs include electronic paper or e-paper and electronic books. The EPDs differ from conventional displays in that they do not emit light, rather, EPDs reflect light. The surface of an EPD is typically either light or dark wherein the light portions reflect light and the dark portions do not reflect light. Thus, EPDs are very similar to paper having white backgrounds and dark text or vice versa. Recent EPDs used in e-book readers have grey scales in their dark portions.

The EPDs have benefits over conventional displays in some applications, such as electronic books or e-books. The pixels in an EPD are typically either off or on and therefore may be controlled by a single bit. If the pixels have gray scales, they are typically controlled by a few bits. The great number of bits required to control a conventional color display is not required to operate EPDs. However, EPDs require complex waveforms to operate that consume CPU resources. In order to change the state of a pixel, several driving steps are required which results in the complex waveforms and the slowness of the display update. The result is that the amount of computation required to change the whole display is multiplied by the number of pixels and the number of steps in the waveform, which is typically about fifty.

The nature of EPDs enables them to remain displaying information indefinitely without power applied to the EPDs. When an EPD is powered down, the information on the display remains. When used in electronic book applications, the controller can display a page on an EPD and subsequently remove power from the EPD as well as put the driving microprocessor in a very low power state or deep sleep, which increases the battery life of the electronic book. When the user of the electronic book needs to change a page, the EPD activates for a short period, and then it turns off until the page is needed to change again. Other display types, such as liquid crystal displays, typically require constant driving, which reduces the battery life of the device.

The EPDs have some drawbacks over conventional displays. The nature of EPDs makes them relatively slow, which causes a noticeable flicker when the display is updated. Therefore, the EPDs are not suited to display information that needs to change quickly, such as videos or applications where the display is required to be continuously updated. The nature of the EPDs requires a great amount of data to operate them, even though each pixel may be represented by just a few bits. When the EPDs are used to display high resolution items that require quick changes, the controllers are often overwhelmed and cannot display the desired images due to the complex waveforms required to operate the EPDs.

Methods of controlling and/or driving EPDs are disclosed wherein the controller uses a dual configuration. In a first configuration, individual pixels on an EPD are controlled; this configuration is referred to as a pixelar format. In a second configuration, regions or pluralities of pixels are controlled together, which is referred to as a regional format. For example, the pixels may be arranged in rectangles wherein individual rectangles, each consisting of a plurality of pixels, are controlled. Therefore, the controller controls a plurality of pixels simultaneously instead of controlling individual pixels. A single ESD may have areas that are being driven in pixelar format and other areas that are being driven in regional format. Software in an application using the display may indicate which format is preferred. If bandwidth and memory resources are available for the pixelar format, it may be used; otherwise, the regional format will be used.

An example of a device 100 using an EPD 104 (sometimes referred to herein simply as the display 104) is shown in FIG. 1. The device 100 may be an electronic book or other electronic reading device that displays information on the display 104. The display 104 is relatively large compared to the footprint of the device 100 because the device 100 primarily serves to display information that is read by a user.

The device 100 runs a software application that causes information to be displayed on the display 104. For example, the software application may cause text or pictures to be displayed. In the embodiment of an electronic book, the software application may cause one page of text to be displayed wherein the page may substantially fill the display 104. A user may provide some input by way of a user input to change the page of text, which is similar to changing a page in a book. For example, icons may be displayed wherein the user touches an icon on the display 104 to provide input to the device 100 or the application running on the device 100. In the case of an electronic book or similar device, the information displayed on the display 104 does not need to change rapidly, so the EPD display 104 works well. Moreover, the regional display format works well for these types of displays. However, as described below, indications provided to the user may change rapidly and may not be conducive to the regional format.

In the embodiments described herein, the application running on the device 100 is using a regional area 106 of the display for images that correspond with the regional format. As described below, the application may determine that the regional format is to be used in the area designated as the regional area 106, which is bounded by a dashed line. In some embodiments, the application may be displaying still pictures or text that is going to remain on the display for a relatively long period. Such display information conforms to the criteria for a regional format. It is noted that the regional area 106 may be dynamic and may be changed as necessary by the application.

In many applications, some of the information displayed may require higher resolution and/or may need to be changed rapidly, which requires the pixelar format. The software application has designated areas of the display 104 where information should be displayed in pixelar format. These areas are referred to as the first pixelar area 110, the second pixelar area 112, the third pixelar area 114, and the fourth pixelar area 116.

The first and second pixelar areas 110, 112 may be user inputs that need to change frequently. For example, the pixelar areas 110, 112 may be icons that indicate the locations of touch screen areas. These touch screen areas have different states wherein the icon images change depending on the states of the icons. Alternatively, the pixelar areas 110, 112 may be information relating to the state of the device 100 that the application is causing to be displayed. The first pixelar area 110 may have a first state where it displays information indicating that it is waiting for user input. In such a first state, the first pixelar area 110 may display a first type of symbol. In a second state, the first pixelar area 110 may provide an indication that a stylus, such as the finger of a user, is located above or proximate the first pixelar area 110 or that the user has pressed the first pixelar area 110. The second state may indicate that the user input has been received by the device 100. A third state of the first pixelar area 110 may indicate that the software application is processing the user input. For example, the first pixelar area 110 may flash in the third state.

The second pixelar area 112 may function in the same manner as the first pixelar area 110. In some embodiments, the first pixelar area 110 may provide for a user to cause the display 104 to display a previous page in a book and the second pixelar area 112 may cause the display 104 to display the next page in the book. When the input is received from the first and/or second pixelar areas 110, 112, the application can change the text or other information displayed in the regional area 106. In such an embodiment, the first and second pixelar areas 110, 112 are required to change much faster than the information in the regional area 106.

The third pixelar area 114 is an icon that indicates that the device 100 or the application is busy processing. The third pixelar area 114 is shown in FIG. 1 as being an hour glass, which is a conventional icon used by computers to show that an application is busy. The hour glass moves in some way to indicate activity, therefore, a pixelar format is more suited to display the hour glass or other icon displayed in the third pixelar area 114 than a regional format. The regional format may not enable the hour glass or other icon to change as required by the application.

The fourth pixelar area 116 is a conventional status bar of the type used by many applications. The status bar keeps the user advised as to the status of an application. In some embodiments, the status bar may continually sweep to indicate that an application is active. In other embodiments, the status bar may fill a status box 118. The portion of the status bar that has filled the status box 118 is proportional to the amount in which the application has completed a task.

All of the pixelar areas 110, 112, 114, 116 are portions of the display 104 that the application has determined need to change rapidly or more rapidly than the regional area 104. Therefore, the application has assigned the pixelar format to these areas of the display 106. The pixelar areas may be dynamic and may change as necessitated by the application. For example, the application may assign the first and second pixelar areas 110, 112 to different locations on the display 104. In doing so, the regional area 106 may move or be reconfigured to accommodate the reassigned first and second pixelar areas 110, 112.

In order to enable pixelar and regional formats to operate simultaneously on the same EPD, the processor (not shown) within the device 100 or a driver that operates the display 104 needs to be able to recognize both formats. The following description relates to the driver that can recognize both formats, however, the functions described below may be implemented by the processor. The driver may determine which areas of the display 104 are to be used in the pixelar format. For example, the driver may default to regional format, and the application may override the default and indicate that certain icons or images are to be displayed in pixelar format. The driver may then drive these portions of the display 104 using the pixelar format and the remainder of the display 104 may be driven using the regional format.

In some embodiments of the device 100, the resources are limited. Therefore, the amount of area on the display 104 that may be allocated to the pixelar format is limited. In order to work with limited resources, the application may rank portions of the image being displayed as to which portions are preferred for the pixelar format. For example, user inputs, such as the first pixelar area 110 and the second pixelar area 112 may receive a high rank for preferred pixelar format. Small indicators, such as the hour glass of the third pixelar area 114 may have a lower rank than the user inputs. Status bars, such as the fourth pixelar area 116 may have the lowest rank. When the device 100 is operating, the driver may apply the rankings and assign pixelar format to the areas with the highest rank first. The assignment of pixelar areas may continue until the resources cannot accommodate any more pixelar areas.

Figure 2:
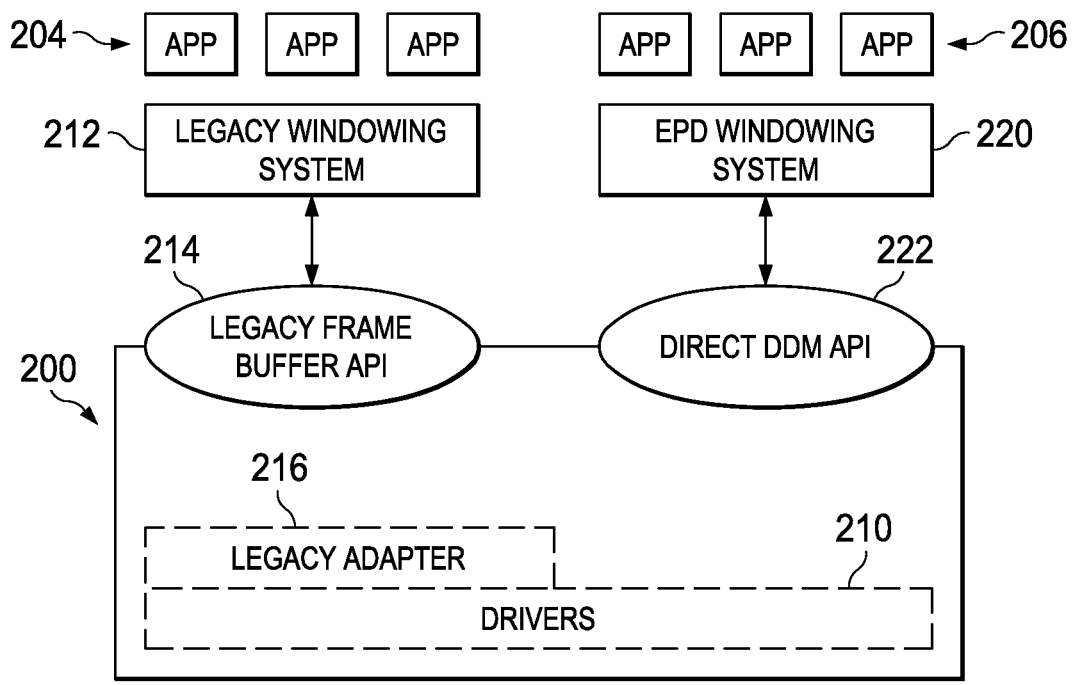
FIG. 2 is an embodiment of software architecture for the electronic device of FIG. 1.

With additional reference to FIG. 2, the device 100 may use a software architecture 200 that runs parallel processes. One process is dedicated to running applications that are referred to as legacy applications 204 in that they do not recognize the ability to operate the display 104 in regional and pixelar formats. The other process is dedicated to running newer applications, referred to herein as EPD applications 206, wherein the EPD applications 206 are programmed to use the regional and pixelar formats. The architecture 200 has a plurality of drivers 210 that serve to operate the device 100, including the display 104.

The legacy applications 204 are run on a legacy windowing system 212. The legacy windowing system 212 does not recognize the dual format of regional and pixelar formats described above. Rather, the legacy windowing system 212 only recognizes one of the formats. For example, devices having small displays or other criteria supporting pixelar format may solely use the pixelar format and other devices may use solely the regional format. The legacy windowing system 212 communicates with a legacy frame buffer application programming interface (API) 214 (herein after legacy API 214) and a legacy adapter 216 to communicate instructions to the drivers 110.

The EPD applications 206 run on an EPD windowing system 220. The EPD windowing system 220 recognizes the dual modes of the device 100 and, therefore, can run the EPD applications 206. A direct API 222 communicates between the EPD windowing system 220 and the drivers 210. Because the device 100 is configured for dual mode operation, no buffering is required with regard to running the EPD applications 206.

Based on the foregoing, the device 100 may run applications that recognize a single format of either regional or pixelar or a dual format that recognizes both formats. With the dual format, the device 100 is able to utilize more resources away from the display when the regional format is in use. Thus, by limiting the use of the pixelar format, the resources of the device 100 may be used for other purposes. In addition, only small portions of the display 104 that are using the pixelar format are changed often. This reduces the amount of flicker that would normally occur when the image on the entire display 104 is changed.

The pixelar format has been described above as controlling single pixels and the regional format has been described above as controlling groups of pixels simultaneously. In some embodiments, the pixelar format controls a small number of pixels, smaller than the number of pixels controlled by the regional format.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. An electrophoretic display comprising:
    a first operating format, in which pixels on at least one area of the electrophoretic display are driven individually; and
    a second operating format, in which a plurality of pixels constituting at least one area of the electrophoretic display are driven simultaneously;
    both the first operating format and the second operating format are performable simultaneously on the electrophoretic display, the pixels are driven by a software application, and a device running the software application determines whether the software application recognizes the first operating format and the second operating format and the device uses one of either the first operating format or the second operating format when the software application does not recognize both the first operating format and the second operating format.

2. The electrophoretic display of claim 1, in which code in the software application determines which areas of the electrophoretic display are used in the first operating format and which areas of the electrophoretic display are used in the second operating format.

3. The electrophoretic display of claim 1, in which areas of the electrophoretic display that change the most are driven using the first operating format.

4. The electrophoretic display of claim 1, in which text is displayed on the electrophoretic display using the second operating format.

5. The electrophoretic display of claim 1, in which the electrophoretic display is electrically connected to an electronic book so as to display text stored in the electronic book, and in which the text is displayed using the second operating format.

* * * * *